US010165578B1

(12) United States Patent
Zappaterra et al.

(10) Patent No.: US 10,165,578 B1
(45) Date of Patent: Dec. 25, 2018

(54) MINIMIZING INTERFERENCE IN A HETEROGENEOUS WIRELESS NETWORK

(71) Applicant: Sprint Spectrum LP, Overland Park, KS (US)

(72) Inventors: Luca Zappaterra, Eindhoven (NL); Muhammad Ahsan Naim, Ashburn, VA (US); Yu Zhou, Herndon, VA (US)

(73) Assignee: Sprint Spectrum L.P., Overland Park, KS (US)

(*) Notice: Subject to any disclaimer, the term of this patent is extended or adjusted under 35 U.S.C. 154(b) by 59 days.

(21) Appl. No.: 15/345,798

(22) Filed: Nov. 8, 2016

(51) Int. Cl.
*H04W 4/00* (2018.01)
*H04W 72/08* (2009.01)
*H04W 16/32* (2009.01)
*H04W 72/04* (2009.01)

(52) U.S. Cl.
CPC ......... *H04W 72/082* (2013.01); *H04W 16/32* (2013.01); *H04W 72/0426* (2013.01)

(58) Field of Classification Search
CPC ........... H04W 72/082; H04W 72/0426; H04W 16/32
See application file for complete search history.

(56) References Cited

U.S. PATENT DOCUMENTS

| 9,077,421 | B1 | 7/2015 | Mehlman et al. | |
| 2010/0087221 | A1* | 4/2010 | Srinivasan | H04W 16/08 455/522 |
| 2010/0111021 | A1* | 5/2010 | Hui | H04W 72/04 370/329 |
| 2011/0255514 | A1* | 10/2011 | Olofsson | H04W 72/0426 370/331 |
| 2014/0080491 | A1* | 3/2014 | Tinnakornsrisuphap | H04W 24/02 455/438 |
| 2014/0098681 | A1* | 4/2014 | Stager | H04W 24/02 370/252 |
| 2015/0296413 | A1 | 10/2015 | Sadek et al. | |
| 2016/0198480 | A1* | 7/2016 | Stanwood | H04L 5/0073 370/329 |
| 2016/0381645 | A1* | 12/2016 | Shanks | H04W 24/10 370/338 |
| 2017/0347312 | A1* | 11/2017 | Kang | H04W 88/10 |

* cited by examiner

*Primary Examiner* — Clemence S Han

(57) ABSTRACT

Minimizing interference in a heterogeneous wireless network includes determining a group of potentially interfering access nodes from among the plurality of neighboring access nodes, based on reference signals transmitted from each of the plurality of neighboring access nodes, and communicating additional signal information between each access node within the group of potentially interfering access nodes. The additional signal information is associated with signals transmitted from said each access node within the group. Each access node within the group performs interference minimization based on the additional signal information, thereby enabling full-duplex operation.

17 Claims, 6 Drawing Sheets

MINIMIZING INTERFERENCE IN A HETEROGENEOUS WIRELESS NETWORK

TECHNICAL BACKGROUND

As wireless networks evolve and grow, there are ongoing challenges in providing high-quality service to increasing numbers of wireless devices or user equipment (UE) in various coverage areas of a wireless network. One approach to improving service quality and coverage is to deploy small access nodes throughout the coverage area of an access node. In a heterogeneous wireless network, macro access nodes along with several small access nodes may be configured to deploy multiple carriers within the same or different frequency bands. However, interference can arise as a result of utilizing the same frequency band. For example, small access nodes utilizing the same frequency band for their backhaul (i.e. uplink) or downlink communications are subject to interference from each other, particularly if they are located in close proximity to one another. Although some small access nodes are capable of minimizing self-interference (i.e., interference caused between uplink and downlink transceivers of the same small access node), thereby being capable of full-duplex communication, such full-duplex communication continues to be subject to interference from nearby small access nodes engaging in uplink or downlink communications.

OVERVIEW

Exemplary embodiments described herein include systems, methods, and nodes for minimizing interference in a heterogeneous wireless network. A method for minimizing interference includes receiving, at a first access node, a reference signal from one or more neighboring access nodes, adding the one or more neighboring access nodes to a potential interferer group associated with the first access node based on the reference signal, determining a potential interference based on additional signal information received from the one or more neighboring access nodes, and processing a first signal at the first access node based on the potential interference. The processed first signal may be received at the first access node from another device, or transmitted from the first access node to another device.

A system for minimizing interference in a heterogeneous wireless network includes a first access node and a second access node. The first access node is configured to broadcast a reference signal within a defined portion of a transmission frame, and the second access node is configured to receive the reference signal, determine that the first access node is among a group of potentially interfering access nodes, and minimize potential interference caused by the first access node to signals received at the second access node.

A processing node for minimizing interference in a heterogeneous wireless network is configured to perform operations comprising determining a group of potentially interfering access nodes from among the plurality of neighboring access nodes, based on reference signals transmitted from each of the plurality of neighboring access nodes, and communicating additional signal information between each access node within the group of potentially interfering access nodes. The additional signal information is associated with signals transmitted from said each access node within the group. Each access node within the group performs interference minimization based on the additional signal information.

DETAILED DESCRIPTION

Figure 1:
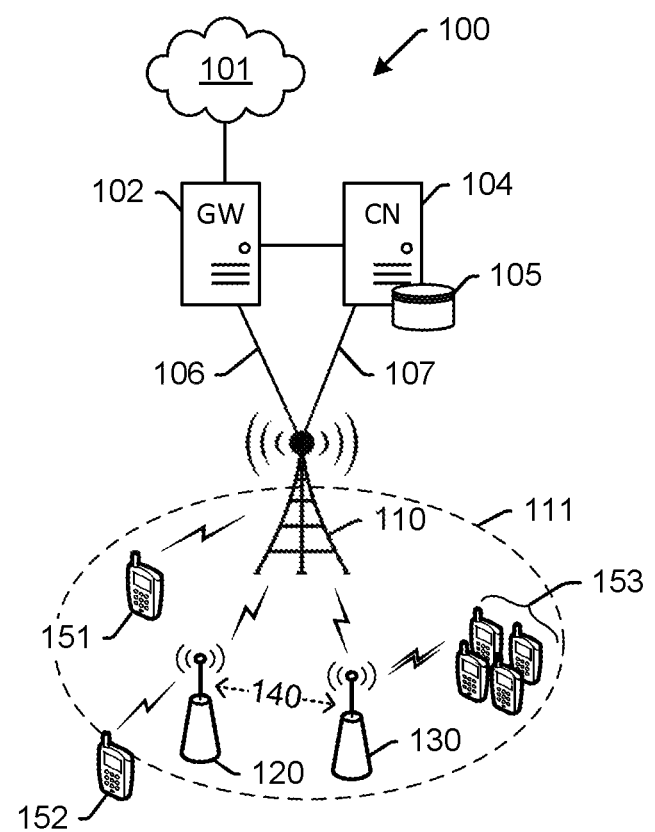
FIG. 1 depicts an exemplary system for minimizing interference in a wireless network.

In embodiments disclosed herein, minimizing interference in a heterogeneous wireless network comprising a plurality of small access nodes includes receiving, at a first access node, a reference signal from one or more neighboring access nodes and, based on the reference signal, determining whether to perform interference minimization operations. The one or more neighboring access nodes can be configured to transmit or broadcast the reference signal within a defined portion of a transmission frame, such that other access nodes in the system, including the first access node, can determine whether or not the one or more neighboring access nodes is a potential interferer. In embodiments described herein, the defined portion of the transmission frame further comprises a plurality of reference signals from a plurality of neighboring access nodes. The defined portion may be designated such that all neighboring access nodes can schedule their reference signals using resources within the defined portion. Moreover, each neighboring access node can be configured to 'listen' or scan for reference signals from potential interferers during the defined portion of the transmission frame.

Upon a strength or power level of a neighboring access node's reference signal meeting a threshold, the neighboring access node is added to a potential interferer group. In embodiments described herein, a determination that a neighboring access node is to be included in the group of potentially interfering access nodes can be based in part on the signal strength of the reference signal being within a predetermined range. Each neighboring access node in the network may be able to configure their own group, such that a group of potentially interfering access nodes is associated with said each neighboring access node. Any neighboring access node that is included within a potential interferer group receives a notification of such inclusion.

Moreover, each access node in the potential interferer group is configured to share additional signal information with other access nodes in the potential interferer group, whether via a direct connection, or via the core network. The additional signal information comprises at least one of a modulation scheme, a coding scheme, and a resource allocation. At any one access node, a potential interference may be determined based on the additional signal information received from one or more neighboring access nodes, and signals transmitted from or received at the first access node can be processed based on the potential interference. The processing can include generating or replicating a signal based on the additional signal information, and subtracting the generated or replicated signal from the signal transmitted from or received at the first access node. Further, each access node within a potential interferer group can perform interference minimization based on the additional signal information received from neighboring access nodes as described herein, thus being capable of full-duplex communication (simultaneous uplink and downlink communication) without being subject to interference from potential interfering neighbors.

Moreover, the measurement and characteristics of the neighbor access nodes and radio signals associated therewith may vary based on a time of day, and can therefore be periodically measured or retrieved and stored in a local database of the relay wireless device and averaged over a period of time. Consequently, each neighboring access node can refer to locally-stored characteristics when it performs interference minimization operations, rather than awaiting the additional information from its neighbors. These and additional operations are further described with respect to the embodiments depicted in FIGS. 1-6 below.

FIG. 1 depicts an exemplary system 100 for minimizing interference in a wireless network. System 100 comprises a communication network 101, gateway 102, controller node 104, access node 110, small access nodes 120 and 130, and end-user wireless devices 151, 152, 153. Access nodes 110 can be any network node configured to provide communication between wireless devices such as wireless device 151 and communication network 101. Access node 110 can be a standard access nodes, such as a macrocell access node such as a base transceiver station, a radio base station, an eNodeB device, or an enhanced eNodeB device, or the like. Small access nodes 120, 130 can be any short range, low power, small access nodes, such as a microcell access node, a picocell access node, a femtocell access node, or the like such as a home NodeB or a home eNodeB device. Further, wireless devices 151, 152, 153 may be any device, system, combination of devices, or other such communication platform capable of communicating wirelessly with access node 110 and small access nodes 12, 130 using one or more frequency bands deployed therefrom. Wireless devices 151, 152, 153 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data with other network nodes on communication network 101. Other types of communication platforms are possible.

Small access nodes 120, 130 can be configured as relay access nodes, i.e. to relay services from access nodes 110 to end-user wireless devices 152 and 153, respectively. For example, access node 110 is illustrated as having coverage area 111, such that wireless device 151 can access network services directly from access node 110. Wireless device 152 is located just outside coverage area 111, and therefore is unable to attach to access node 110. Consequently, small access node 120 may be configured to relay communications between access node 110 and wireless device 152. Further, although cluster of wireless devices 153 is located within coverage area 111, cluster 153 may overload access node 110, which may be serving numerous other devices that are not shown. Consequently, small access node 130 may be configured to relay communications between access node 110 and cluster 153. Small access nodes 120, 130 acting as relay nodes can comprise components such as relays and access points that are further described with reference to FIG. 2.

In operation, as described above, when small access nodes 120 and 130 are located in closed physical proximity with each other, there can be interference 140 caused by transmissions from one of small access nodes 120, 130 to the other. For example, as small access node 120 is engaged in a downlink transmission to wireless device 152, the downlink transmission can cause interference to signals received at or transmitted from access node 130. If small access node 120 is engaged in an uplink transmission to access node 110 (i.e. transmission on a backhaul link), the transmission can cause interference to signals at small access node 130. Similarly, uplink or downlink transmissions initiating from small access node 130 can cause interference to signals received at or transmitted from small access node 120. Such interference is particularly prevalent when small access nodes 120, 130 utilize the same frequency or frequency bands.

Thus, each of small access nodes 120, 130 can be configured to minimize interference by first determining whether or not its neighboring small access node is a potentially interfering access node, and performing minimization operations to signals received thereat or transmitted therefrom. The determination of potential interference may be based on a reference signal broadcast from each small access node 120, 130. For example, each of small access nodes 120, 130 may be configured to transmit or broadcast the reference signal within a defined portion of a transmission frame, such that other access nodes in the system (including small access nodes 120, 130) can determine a potential interferer. The defined portion of the transmission frame (such as, for instance, the first few resource blocks of an LTE transmission frame) may be designated such that all neighboring access nodes can schedule their reference signals using resources within the defined portion.

In an exemplary embodiment, small access node 120 is configured to measure or otherwise obtain a signal measurement of a reference signal transmitted by small access node 130 to determine if small access node 130 is a potential interferer. For example, the signal measurement can include a reference signal receive power (RSRP) and/or a signal-to-interference noise radio (SINR) of the reference signal. Alternatively or in addition, the reference signal can include additional information, such as a transmit power of small access node 130, or other system information. For instance, the reference signal can include a SIB2 message. Upon the signal measurement of the reference signal from small access node 130 meeting a threshold or falling within a predetermined range, small access node 120 can be configured to add small access node 130 to its potential interferer group, and notify small access node 130 of such inclusion into the group.

Consequently, small access node 130 is configured to periodically or on an ongoing basis transmit additional signal information to small access node 120. The additional signal information comprises at least one of a modulation scheme, a coding scheme, or a resource allocation. The additional signal information may be transmitted directly from small access node 130 to small access node 120 via, for instance, an X2 connection (not shown). Alternatively or in addition, the additional signal information may be transmitted via the core network, i.e. access node 110, controller node 104, or any other network element. For an indirect transmittal via the core network, a low-latency backhaul connection (i.e. wired or wireless connection between small access node 130 and access node 110) can be sufficient.

In either case, based on this additional signal information, and/or the measurements from the reference signal and other attributes of small access node 130, small access node 120 is configured to determine a potential interference caused by small access node 130, and to perform interference minimization procedures on signals transmitted from or received at small access node 120. For example, small access node 120 can generate or replicate a signal transmitted from small access node 130, based on the additional signal information received from small access node 130. Small access node 120 can subtract the generated or replicated signal from any signal that is locally generated (i.e. at small access node 130) or received from another source, such as access node 110 or wireless device 152. For instance, small access node 120 can subtract the replicated signal from a downlink signal received from access node 110, such that the interference caused by small access node 130 is minimized from said downlink signal.

Although these operations have been described with respect to small access node 120 performing interference minimization processes based on a reference signal received from small access node 130, the same operations can be performed by small access node 130 based on a reference signal received from small access node 120. Moreover, other variations are possible in a system comprising a plurality of small access nodes, as further described in FIG. 5. Generally, each neighboring access node in a network may be able to configure their own group of potentially interfering access nodes, such that any neighboring access nodes in the group receives a notification of such inclusion, and shares additional signal information with other access nodes in the potential interferer group, whether via a direct connection, or via the core network. Consequently, each access node within a potential interferer group can perform interference minimization based on the additional signal information received from neighboring access nodes as described herein.

Moreover, reference signal measurements and other signal information may be obtained periodically, at specific times, or averaged over a time period. For example, the reference signal measurement of each small access node 120, 130 may vary based on a time of day, and can therefore be periodically measured and stored in a local database of said each small access node 120, 130 performing the measurement. Further, the additional signal information shared between access nodes known to be potential interferers can also vary in different situations, such as time of day, load, etc. Consequently, relay wireless device 130 can determine averages and trends in such information, and use the averages and trends to minimize interference locally. In some embodiments, reference signal power and additional information may be stored in database 105 coupled to controller node 104, with each small access node 120, 130 requesting this information from controller node 104 to use in interference minimization.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107, may include Si communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing information related to access node 110 and small access nodes 120, 130, including reference signal information, location, and additional information such as groups of potential interferers, etc. The software comprises computer programs, firmware, or some other form of machine-readable instructions, and may include an operating system, utilities, drivers, network interfaces, applications, or some other type of software, and combinations thereof. Controller node 107 can receive instructions and other input at a user interface.

Access node 110 can comprise a processor and associated circuitry to execute or direct the execution of computer-readable instructions to obtain information. Access node 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 110 can receive instructions and other input at a user interface. Access node 110 communicate with gateway node 102 and controller node 104 via communication links 106, 107.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, small access nodes 120, 130, and communication network 101

Figure 2:
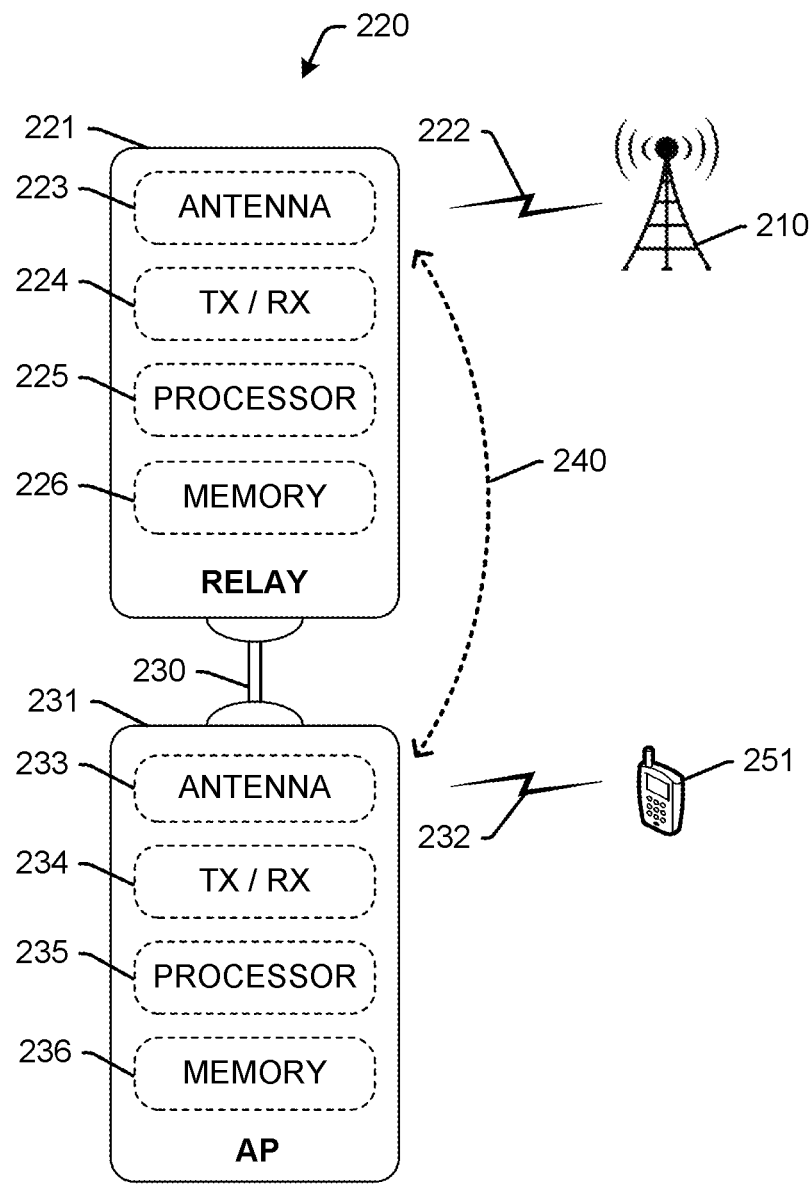
FIG. 2 depicts components of an exemplary small access node for minimizing interference in a wireless network.

FIG. 2 depicts components of an exemplary small access node 220 for minimizing interference in a wireless network. Small access node is illustrated as comprising a relay module 221 for direct (i.e. unrelayed) communication with access node 210 via communication link 222 (i.e., a backhaul connection), and an access point (AP) 231 for deploying a wireless communication link 232, enabling wireless device 251 to attach to relay node 220. Relay 221 can be coupled to AP 231 via a communication interface 230. Communication interface 230 may be any interface that enables direct communication between relay 221 and AP 231, such as USB, FireWire, or any other serial, parallel, analog, or digital interface. Relay 221 comprises an antenna 223, a transceiver 224, a processor 225, and a memory 226. Similarly, AP 231 is illustrated as comprising an antenna 233, a transceiver 234, a processor 235, and a memory 236. Although only one transceiver is depicted in each of relay 221 and AP 231, additional transceivers may be incorporated in order to facilitate communication across interface 230 and other network elements.

Moreover, memories 226 and 236 can store logical instructions that are executed by processor 225 to perform numerous operations as described herein. For example, the operations include determining a potential interference, and minimizing interference. In one exemplary embodiment, there may be interference 240 caused to antenna 223 by transmissions from antennae 233, and vice versa. For example, antenna 233 is engaged in a downlink transmission over link 232 to wireless device 251, the downlink transmission can cause interference 240 to signals received at or transmitted from antenna 223. Alternatively or in addition, if antenna 223 is engaged in an uplink transmission to access node 210 (i.e. over backhaul link 222), the transmission can cause interference to signals at antenna 233. Since relay 221 and AP 231 are collocated and/or connected via interface 230, it is possible to communicate any signal information across interface 230, enabling one or both of relay 221 and AP 231 to minimize the interference caused by the other.

However, the situation is different for interference caused by neighboring access nodes. For example, uplink or downlink transmissions initiating from a neighboring small access node (not shown here but described in further detail in FIGS. 4A-4B) can cause interference to signals received at or transmitted from either antenna 223 or 233. Such interference is particularly prevalent when small access nodes 120, 130 utilize the same frequency or frequency bands. To mitigate this interference, either memory 226 or 236 can comprise modules that enable determining whether or not the neighboring small access node is a potentially interfering access node, and performing minimization operations to signals received thereat or transmitted therefrom. The determination of potential interference may be based on a reference signal broadcast from the neighboring access node.

Figure 3:
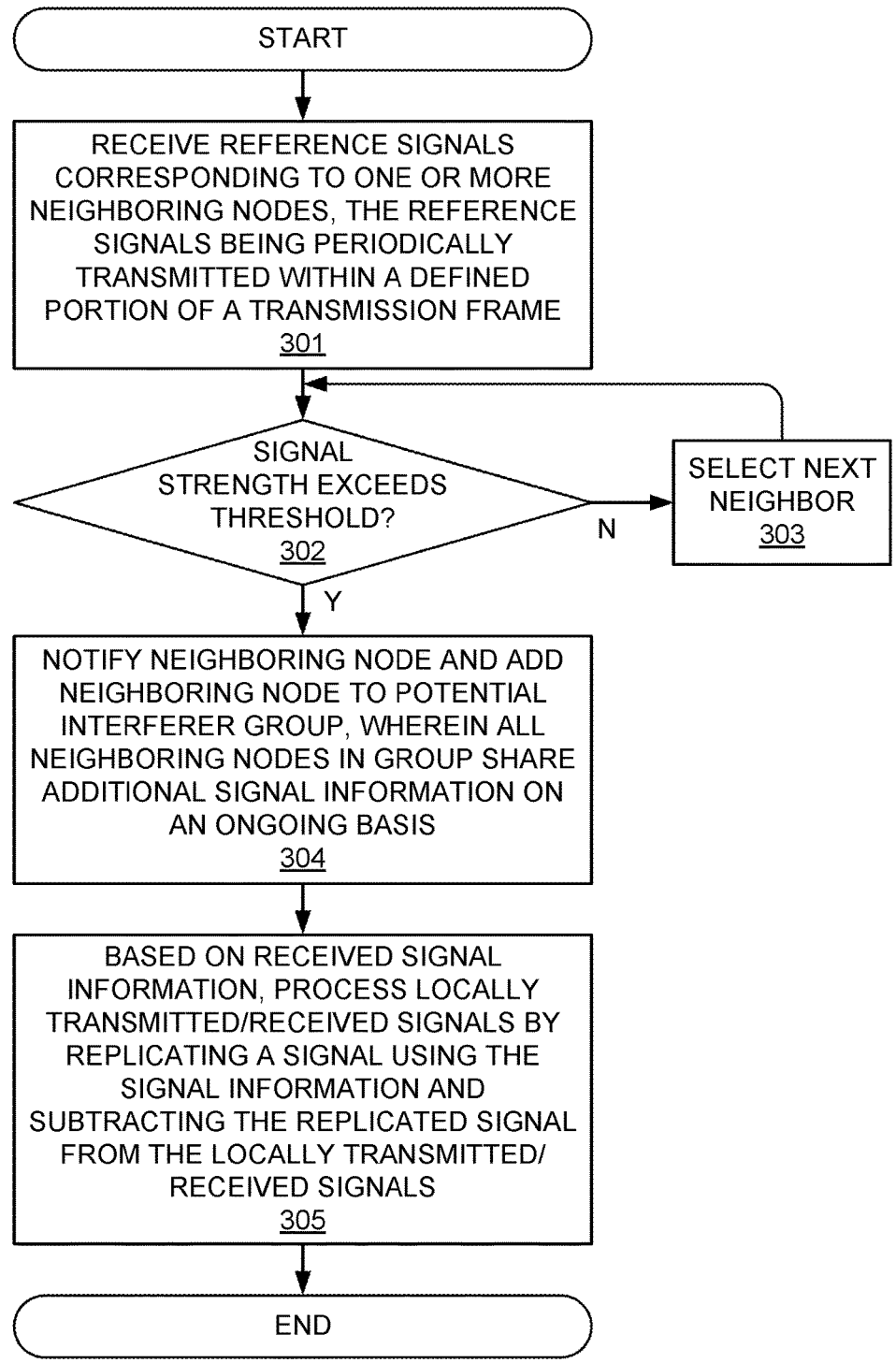
FIG. 3 depicts an exemplary method for minimizing interference in a wireless network.

FIG. 3 depicts an exemplary method for minimizing interference in a wireless network. The method of FIG. 3 is generally discussed with reference to elements within system 100. For example, the method comprises operations that may be performed by one or both of small access nodes 120, 130. In other embodiments, the method can be implemented with any suitable network element, such as small access node 220 illustrated in FIG. 2. Although FIG. 3 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 301, a reference signal is received from one or more neighboring nodes. For example, each small access node in a network may be configured to transmit or broadcast a reference signal within a defined portion of a transmission frame, such that other access nodes in the network can determine a presence of a potential interferer. The defined portion of the transmission frame (such as, for instance, the first few resource blocks of an LTE transmission frame) may be designated such that all neighboring access nodes can schedule their reference signals using resources within the defined portion.

At 302, a signal measurement of each reference signal transmitted by the neighboring nodes is compared with a threshold or range of measurements to determine if the source of the reference signal is a potential interferer. For example, the signal measurement can include a reference signal receive power (RSRP) and/or a signal-to-interference noise radio (SINR) of the reference signal. Alternatively or in addition, the reference signal can include additional information, such as a transmit power of the source of the reference signal. If the signal measurement of the reference signal does not meet the threshold or fall within the predetermined range, then at 303, another reference signal from another neighboring node is compared with the threshold, if available.

Upon the signal measurement of the reference signal meeting the threshold or falling within the predetermined range, at 304, the neighboring access node that transmitted the signal is added to a potential interferer group, and notified of such inclusion into the group. Consequently, the neighboring access node (as well as all other access nodes within the group) is configured to periodically or on an ongoing basis transmit additional signal information to each other, including to the node performing the operations described in this embodiment. The additional signal information comprises at least one of a modulation scheme, a coding scheme, or a resource allocation. The additional signal information may be transmitted directly via, for instance, an X2 connection between neighboring access nodes, or may be transmitted via the core network via, for instance, a low-latency backhaul connection.

At 305, based on this additional signal information, and/or the measurements from the reference signal and other attributes of the neighboring access node (such as load, location, etc.), a potential interference caused by small access node is determined, and interference minimization procedures are performed on locally transmitted or received signals. For example, a signal transmitted from an interfering neighboring access node can be replicated based on the additional signal information received from said interfering neighboring access node, and subtracted from any signal that is locally generated or received from another source. The subtraction or any other similar process is intended to reduce the interference caused by the interfering neighbor. Each neighboring access node in a network may be able to configure their own group of potentially interfering access nodes, such that any neighboring access nodes in the group receives a notification of such inclusion, and shares additional signal information with other access nodes in the potential interferer group, whether via a direct connection, or via the core network. Consequently, each access node within a potential interferer group can perform interference minimization based on the additional signal information received from neighboring access nodes as described herein.

Figure 4A:
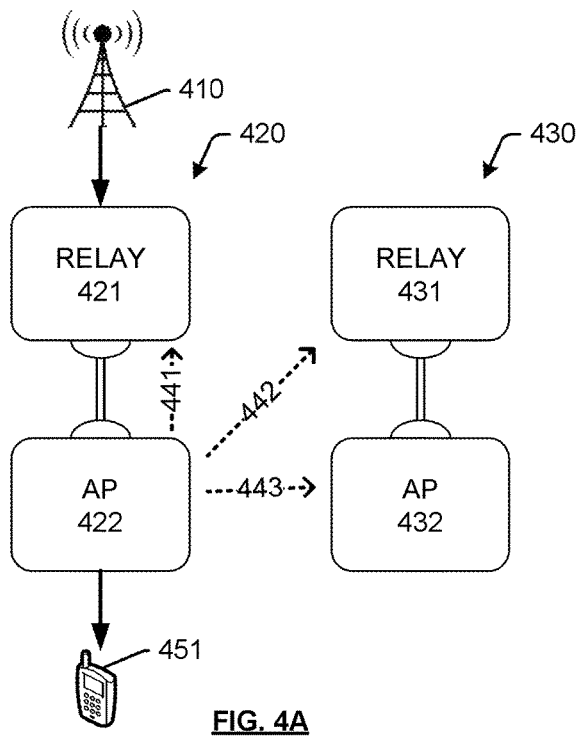
FIGS. 4A-4B depict an exemplary small access node for minimizing interference from a neighboring small access node.
Figure 4B:
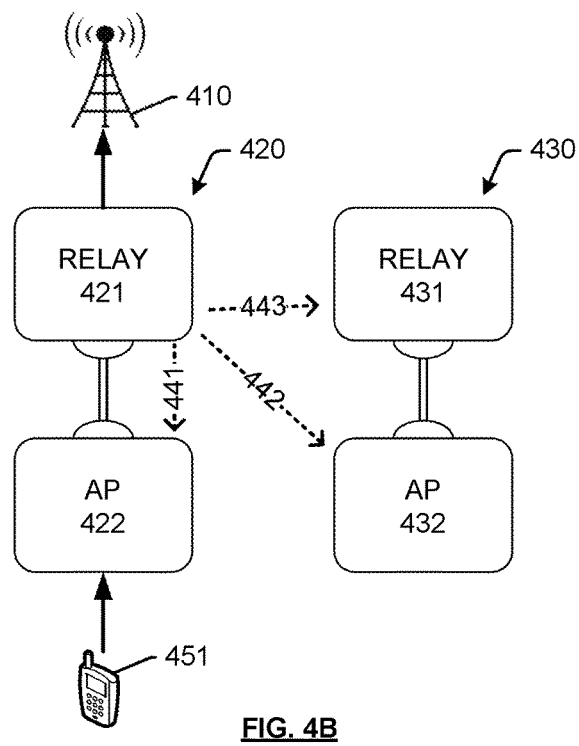

FIGS. 4A-4B depict an exemplary small access node 430 for minimizing interference from a neighboring small access node 420. Small access node 420 is illustrated as comprising a relay module 421 for communication with access node 410 (i.e. a backhaul connection) and an access point (AP) 422 for deploying a wireless communication link with a wireless device 251. Small access node 430 is similarly illustrated as comprising a relay module 431 and an access point (AP) 432, without depiction of additional access nodes or wireless devices for clarity.

As depicted in the embodiment of FIG. 4A, small access node 420 is engaged in a downlink communication originating from access node 410 and ending at wireless device 451. Thus, while relay 421 is receiving data from access node 410, AP 422 is transmitting data to wireless device 451. The transmittal of data from AP 422 can cause interference to other nodes utilizing the same frequency. For example, interference 441 can affect transmissions sent from or received at relay 421, and interferences 442, 443 can respectively affect transmissions sent from or received at relay 431 and AP 432 of neighboring access node 430. relay 421 is configured to minimize the self-interference, as described above with respect to FIG. 2.

Further, both relay 431 and AP 432 are configured to determine a potential interference caused by AP 422, and minimize the interference as described herein. For example, both relay 431 and AP 432 include modules that enable determining whether or not AP 422 node is a potentially interfering node (based at least on reference signals transmitted therefrom), and minimizing the interference based on additional signal information transmitted by AP 422. AP 422 may be configured to broadcast a reference signal within a defined portion of a transmission frame. The defined portion of the transmission frame (such as, for instance, the first few resource blocks of an LTE transmission frame) may be designated such that all neighboring access nodes (including access node 430) can transmit reference signals within the defined portion. If a signal measurement of the reference signal (as performed at either relay 431 or AP 432) meets a threshold or falls within a predetermined range, access node 420 (and AP 422 thereof) is notified, and transmits additional signal information to access node 430 periodically or on an ongoing basis. The additional signal information may be transmitted directly via, for instance, an X2 connection between access nodes 420, 430 (not shown), or may be transmitted via the core network via, for instance, access node 410. Based on this additional signal information, and/or the measurements from the reference signal and other attributes of access node 420 (such as load, location, etc.), a potential interference caused by AP 422 is determined at either relay 431 or AP 432, and interference minimization procedures are performed on locally transmitted or received signals.

Referring now to FIG. 4B, small access node 420 is engaged in an uplink communication originating from wireless device 451 and terminating at access node 410 (or other network elements connected thereto). Thus, while AP 422 is receiving data from wireless device 451, relay 421 is transmitting data to access node 410. The transmittal of data from relay 421 can cause interference to other nodes utilizing the same frequency. For example, interference 441 can affect transmissions sent from or received at AP 422, and interferences 442, 443 can respectively affect transmissions sent from or received at relay 431 and AP 432 of neighboring access node 430. Since relay 421 and AP 422 are collocated and/or connected via an interface, it is possible to communicate any signal information in real-time, enabling one AP 422 to minimize the interference 441. Further, both relay 431 and AP 432 are configured to determine a potential interference caused by relay 421, and minimize the interference as described above with respect to FIG. 4A.

Figure 5:
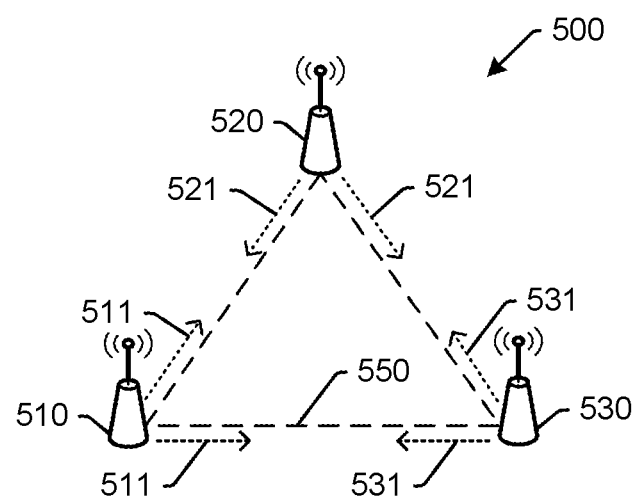
FIG. 5 depicts an exemplary group of neighboring small access nodes for minimizing interference from each other.

FIG. 5 depicts an exemplary group 500 of neighboring small access nodes for minimizing interference from each other. As described above and with reference to FIG. 2, access nodes 510, 520, and 530 each comprise at least a relay and an access point. Further, group 500 is formed based on signal measurements of reference signals from each of small access nodes 510, 520, and 530 meeting a threshold or falling within a predetermined range, such that each of small access nodes 510, 520, and 530 has been determined to be a potential interferer. Consequently, each small access node 510, 520, and 530 is configured to periodically or on an ongoing basis transmit additional signal information to its neighbors.

For example, small access node 510 transmits signal information 511 to both small access nodes 520 and 530. The additional signal information comprises at least one of a modulation scheme, a coding scheme, or a resource allocation, and may be transmitted in real-time, i.e. contemporaneously, or in advance of a signal being generated at and transmitted from small access node 510. In other words, small access node 510 is configured to provide signal information 511 related to signals that it intends to transmit, such that each of small access nodes 520, 530 are able to minimize the interference as soon as possible. Similarly, small access node 520 transmits signal information 521 to both small access nodes 510 and 530, and small access node 530 transmits signal information 531 to both small access nodes 510 and 520. As depicted herein, the additional signal information may be transmitted directly between each of small access nodes 510, 520, 530 via, for instance, an X2 connection 550. Alternatively or in addition, the additional signal information may be transmitted via a core network connected to each of small access nodes 510, 520, 530 (not shown).

Based on signal information 511, 521, and 531, and/or the measurements from the reference signal and other attributes of each neighboring access node 510, 520, 530, interference minimization procedures are performed on locally transmitted or received signals. For example, a signal transmitted from an interfering neighboring access node 510 can be replicated at each of neighboring access nodes 520, 530 based on the additional signal information 511. The replicated signal can be subtracted from any signal that is locally generated or received at neighboring access nodes 520, 530, in efforts to minimize the interference caused by interfering access node 510. Furthermore, each neighboring access node 510, 520, 530 is able to configure their own group of potentially interfering access nodes, such that additional signal information is shared with each node in the potential interferer group associated with said each neighboring access node. Consequently, each access node within a potential interferer group can perform interference minimization based on the additional signal information received from neighboring access nodes as described herein.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access node 110, small access nodes 120, 130, and/or network 101.

Figure 6:
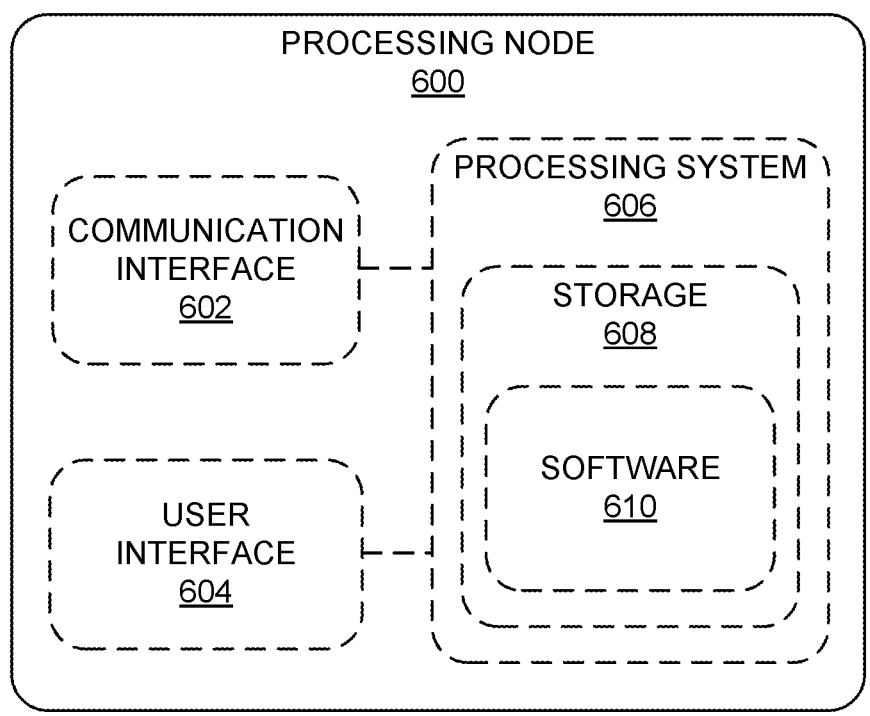
FIG. 6 depicts an exemplary processing node for minimizing interference in a wireless network.

FIG. 6 depicts an exemplary processing node 600 comprising communication interface 602, user interface 604, and processing system 606 in communication with communication interface 602 and user interface 604. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. For example, storage 608 may include a buffer. Software 610 may include computer programs, firmware, or some other form of machine-readable instructions, including an operating system, utilities, drivers, network interfaces, applications, or some other type of software. For example, software 610 may include a module for determining a preferred donor access node, as described herein. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for minimizing interference in a heterogeneous wireless network, the method comprising:
receiving, at a first access node, a reference signal from a neighboring access node within a defined portion of a transmission frame, wherein the neighboring access node is one of a plurality of neighboring access nodes, each of which is configured to schedule a corresponding plurality of reference signals using resources within the defined portion of the transmission frame;
based on the reference signal, adding the neighboring access node to a potential interferer group associated with the first access node;
determining a potential interference based on additional signal information received from the neighboring access node; and
processing a first signal at the first access node based on the potential interference.

2. The method of claim 1, wherein the reference signal is received periodically in every subsequent transmission frame.

3. The method of claim 1, further comprising adding one or more of the plurality of neighboring access nodes to the potential interferer group based on the corresponding plurality of reference signals.

4. The method of claim 1, wherein the additional signal information comprises at least one of a modulation scheme, a coding scheme, and a resource allocation.

5. The method of claim 4, wherein determining the potential interference comprises generating a second signal based on the additional signal information.

6. The method of claim 5, wherein processing the first signal based on the potential interference comprises subtracting the second signal from the first signal.

7. The method of claim 1, wherein the additional signal information is received via one or more of a direct connection with the neighboring access node or a low-latency backhaul connection with the heterogeneous wireless network.

8. A system for minimizing interference in a heterogeneous wireless network, the system comprising:
   a plurality of neighboring access nodes configured to schedule a corresponding plurality of reference signals using resources within a defined portion of a transmission frame;
   a first access node from among the plurality of neighboring access nodes, the first access node being configured to:
   broadcast a reference signal within the defined portion of the transmission frame; and
   a second access node from among the plurality of neighboring access nodes, the second access node being configured to:
   receive the reference signal;
   determine that the first access node is among a group of potentially interfering access nodes from among the plurality of neighboring access nodes; and
   minimize potential interference caused by the first access node to signals received at the second access node.

9. The system of claim 8, wherein the second access node is further configured to determine that the first access node is among the group of potentially interfering access nodes based in part on a signal strength of the reference signal measured at the second access node.

10. The system of claim 9, wherein the second access node is further configured to determine that the first access node is among the group of potentially interfering access nodes based in part on the signal strength of the reference signal measured at the second access node being within a predetermined range.

11. The system of claim 8, wherein the second access node is further configured to transmit a notification to the first access node indicating that the first access node is among the group of potentially interference access nodes.

12. The system of claim 11, wherein the first access node is configured to transmit additional signal information to the second access node upon receiving the notification, wherein the additional signal information comprises at least one of a modulation scheme, a coding scheme, and a resource allocation associated with signals transmitted from the first access node.

13. The system of claim 12, wherein the second access node is configured to minimize potential interference caused by the first access node to the signals received at the second access node based in part on the additional signal information.

14. A processing node for minimizing interference in a heterogeneous wireless network, the processing node being configured to perform operations comprising:
   instructing a plurality of neighboring access nodes to schedule a corresponding plurality of reference signals using resources within a predefined portion of a transmission frame;
   determining a group of potentially interfering access nodes from among the plurality of neighboring access nodes, based on the reference signals transmitted from each of the plurality of neighboring access nodes; and
   communicating additional signal information between each access node within the group of potentially interfering access nodes, the additional signal information being associated with signals transmitted from said each access node within the group,
   wherein each access node within the group performs interference minimization based on the additional signal information.

15. The processing node of claim 14, wherein determining the group is based on a signal strength of the reference signals transmitted during the predefined portion meeting a threshold.

16. The processing node of claim 14, wherein the additional signal information is communicated between each access node in the group via a direct connection between said each access node.

17. The processing node of claim 14, wherein the additional signal information is communicated between each access node in the group via a low-latency backhaul connection of said each access node.

* * * * *